United States Patent [19]

Burnette et al.

[11] Patent Number: 4,848,542
[45] Date of Patent: Jul. 18, 1989

[54] PACKAGE FOR RETAINING AND MOUNTING A MIRROR

[76] Inventors: Richard Burnette; Barbara A. Mucker, both of 1665 Bloomfield Pl., Apt. 414A, Bloomfield Hills, Mich. 48013

[21] Appl. No.: 182,884

[22] Filed: Apr. 18, 1988

[51] Int. Cl.⁴ .......................... B65D 5/50; G02B 7/18
[52] U.S. Cl. ...................................... 206/45.14; 4/559; 4/605; 132/316; 206/454; 206/581; 206/829; 248/206.4; 248/467; 350/632
[58] Field of Search ................ 206/44 R, 44 B, 45.14, 206/77.1, 454, 460, 581, 829; 248/206.2, 206.3, 206.4, 467, 362, 363; 132/291, 301, 302, 304, 305, 316; 4/546, 559, 597, 605; 350/631-641

[56] References Cited

U.S. PATENT DOCUMENTS

| | | | |
|---|---|---|---|
| 2,182,200 | 12/1939 | Donaldson | 206/45.14 |
| 2,235,283 | 3/1941 | Carver | 206/45.14 |
| 3,071,886 | 1/1963 | Stiller | 248/206.3 |
| 3,596,756 | 8/1971 | Nathan et al. | 206/454 |
| 3,688,895 | 9/1972 | Wilson | 206/77.1 |
| 3,708,218 | 1/1973 | Smillie, III | 248/467 |
| 3,743,389 | 7/1973 | Stiller et al. | 206/454 |
| 4,043,450 | 8/1977 | Rielly | 206/45.14 |
| 4,529,278 | 7/1985 | Nugent | 350/631 |
| 4,605,292 | 8/1986 | McIntosh | 350/361 |
| 4,611,716 | 9/1986 | Sorlien | 248/206.3 |

FOREIGN PATENT DOCUMENTS 274899 12/1965 Australia .............................. 248/363

Primary Examiner—Stephen Marcus
Attorney, Agent, or Firm—Krass & Young

[57] ABSTRACT

A package for retaining a mirror or other rigid, generally planar article includes suction means upon the front and back surfaces thereof. One set of suction means is adapted to affix the package to a smooth surface, and the second suction means is adapted to affix the mirror to the package. In this manner, the package is adapted to retain and protect a mirror therewithin as well as to removably affix that mirror to a surface.

15 Claims, 1 Drawing Sheet

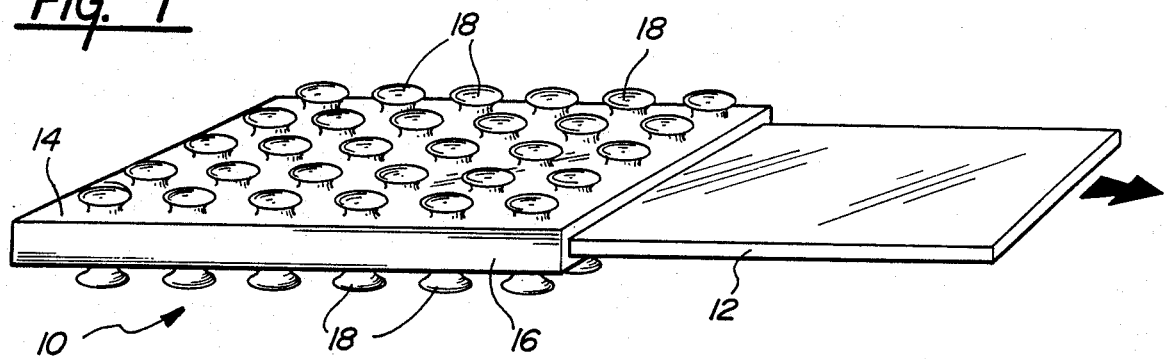
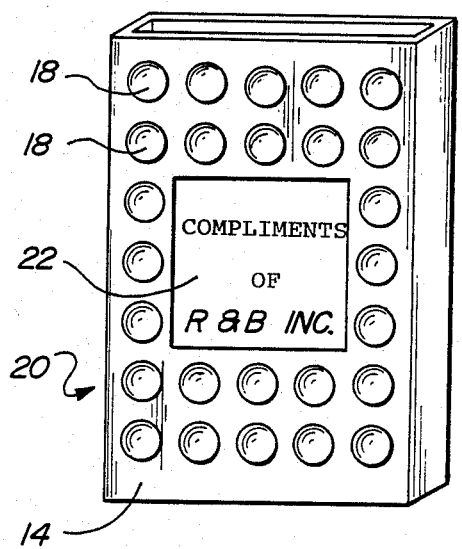
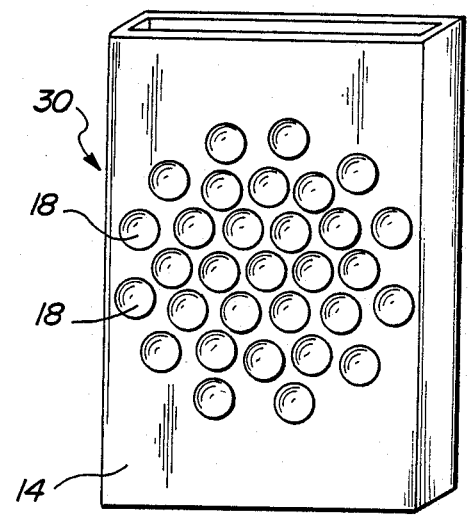
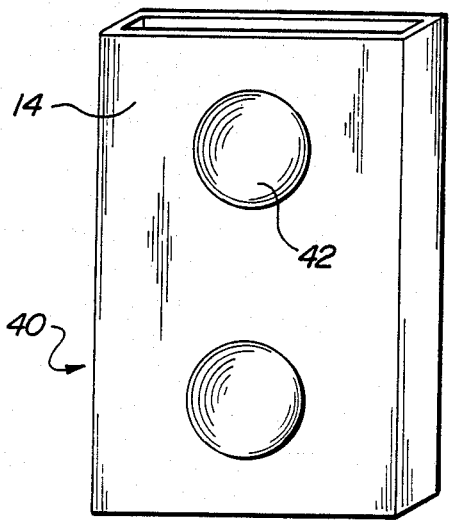
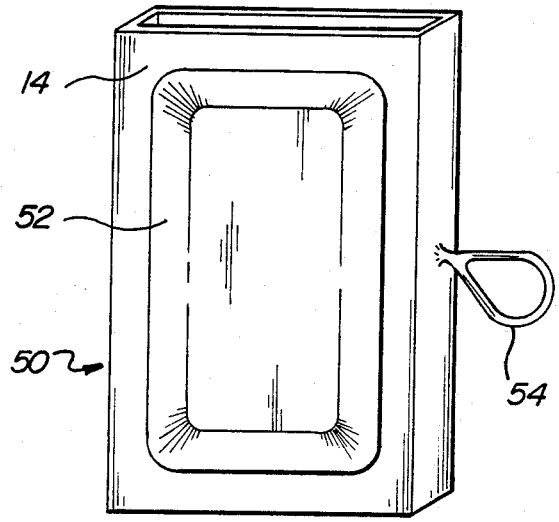

PACKAGE FOR RETAINING AND MOUNTING A MIRROR

FIELD OF THE INVENTION

This invention relates generally to packages and more particularly to a package adapted to receive a mirror or other planar object therein and further adapted to provide for the mounting of that mirror onto a smooth surface.

BACKGROUND OF THE INVENTION

Mirrors have been in long and widespread use. People the world over have found mirrors to be essential for washing, shaving, applying make-up and other grooming operations as well as for the insertion of contact lenses and the removal of foreign objects from the eye. Because of their utility, mirrors are ubiquitous and can be found installed in homes, hotels, office buildings, restrooms and a variety of other public and private accommodations. While such permanently mounted mirrors are widely available, many persons nonetheless find it necessary to carry an individual mirror with them in pocket, purse, or travel luggage.

Generally these personal mirrors are relatively small items fabricated from glass, plastic or metal and they usually are carried in a case so as to prevent breakage or scratching. While such small, personal mirrors are quite useful for travelers and the like, problems are frequently encountered because of a lack of adequate facilities for positioning such mirrors in a usable orientation. In some instances it is possible for the user to hold the mirror in one hand while making use of it; however, as many operations such as insertion of contact lenses, application of make-up or removal of foreign objects from the eye frequently require the concerted use of both hands. It is possible in some instances to place a portable mirror upon a tabletop or shelf; however, it will be readily appreciated that it would be highly desirable to have a simple means for affixing a pocket-sized mirror to a wall, shower stall, locker or other surface. It will be further appreciated that any such means for affixing the mirror be relatively simple, low cost and not occupy unduly large amounts of space.

U.S. Pat. No. 4,529,278 depicts a child's mirror including a number of permanently affixed suction cups for adhering the mirror to a surface. It should be noted however that the thus configured mirror is not readily suited for transport from place to place insofar as it does not include any type of case. Additionally, it should be appreciated that any case adapted to retain the therein disclosed mirror would of necessity be a relatively bulky item because of the need to accommodate the permanently affixed suction cups.

Pat. No. 4,611,716 discloses a toiletries box including a suction cup mounting device adapted to adhere the box to a shower wall or the like. The box further includes a mirror disposed on the interior lid thereof and accessible when the box is open and adhered to the shower wall. While this system does provide for a transportable, affixable mirror it is a relatively bulky unit whose prime purpose is to retain soap, shampoo and other such items for travel. Its size would of necessity preclude it being carried in the pocket or purse.

It should then be apparent that there is a need for a simple, readily transportable mirror which may be removably adhered to a variety of surface. It is further desirable that such mirror include a case for its protection. According to the present invention, as will be disclosed in greater detail hereinbelow there is provided a case adapted to enclose and protect a mirror or other such planar object and further including suction mounting means for adhering the mirror to a variety of surfaces. These and other advantages of the present invention will be readily apparent from the drawings, discussion, description and claims which follow.

SUMMARY OF THE INVENTION

There is disclosed herein a package for retaining a rigid, generally planar article such as a mirror therein and for removably affixing that article to a surface. The package comprises a case including a generally planar front member and a generally planar back member as well as a side member joining the front and back members in spaced apart, generally coplanar relationship. The front, back and side members define an interior cavity therebetween adapted to receive the planar article. The case further includes an opening therethrough communicating with the interior cavity and being of a size sufficient to permit passage of the article therethrough. The package further includes a first suction means disposed on an exterior surface of the front member operative to removably affix the case to a smooth surface as well as second suction means disposed upon an exterior surface of the back member operative to removably affix the article to the case. The case is thus adapted to receive and retain the planar article therein as well as to provide for the removable mounting of the article onto a smooth surface.

In one particular embodiment the front and back members are generally rectangular members of similar size and the side member joins the front and back members along three common edges, the unjoined edge providing the opening to the interior thereof. In another embodiment, the front and back members are generally circular and the side member joins a portion of the perimeter of the circular members, the unjoined portion defining the opening.

The case and suction means may be fabricated as a unitary body as for example by injection molding or other such processes. The package may be formed from an elastomeric material such as synthetic rubber, natural rubber, polyvinyl chloride or any other synthetic organic polymer.

The suction means may comprise a single suction cup or a plurality of suction cups covering either all or a portion of the surface of the case. In some instances the suction cups may cover only a portion of the front or back member so as to provide a region adapted to have advertising logos or other indicia affixed thereupon. The case may further include a loop or other such means for retaining a razor or other grooming item therein.

BRIEF DESCRIPTION OF THE INVENTION

FIG. 1 is a side perspective view of one embodiment of package for retaining as well as removably affixing a mirror or other planar object;

FIG. 2A is a front perspective view of another embodiment of package structured in accord with the principles disclosed herein and adapted to bear indicia thereupon;

FIG. 2B is a front perspective view of yet another embodiment of package structured in accord with the principles of the present invention;

FIG. 2C is a front perspective view of still another embodiment of package configured in accord with present invention; and FIG. 2D is a front perspective view of a further embodiment of the present invention illustrating the use of a generally rectangular suction cup, and including article support means.

DETAILED DESCRIPTION OF THE INVENTION

Referring now to FIG. 1, there is shown one particular embodiment of package 10, structured in accord with the principles of the present invention and adapted to retain a mirror 12 or other similar, rigid, generally planar article therein. The package 10 of FIG. 1 is configured as a generally rectangular case including a generally planar front member 14 and a corresponding rear member, not visible in this view. It should be noted that as used herein the term "generally rectangular" is meant to include square shapes as well as various other parellograms.

The front member 14 and rear member are joined along their peripheries in a spaced apart, generally coplanar relationship by a side member 16 so as to define an interior cavity therebetween, of a sufficient size to receive and retain the mirror 12. As shown, the side member 16 joins three corresponding edges of the front member 14 and rear member, the remaining unjoined edges serving to define an opening communicating with the interior cavity and being of sufficient size to receive the mirror 12. Obviously, the front 14 and rear members may be joined on only one or two sides. The front and rear members may be joined without resort to a discrete side member piece, but they may be joined by laminating them together, or by being molded as a unitary, joined piece, in which case the joined portions will provide the side member.

Both the front surface 14 and the rear surface have associated therewith suction means, which in this particular embodiment each comprise a plurality of individual suction cups 18 arrayed in a matrix form covering substantially all of the front surface 14 and the rear surface of the case. One of these sets of suction cups 18 associated with either the front surface 14 or the rear surface, may be employed to affix the package 10 to a shower stall, wall, locker or other such smooth surface, and the other set of suction cups 18 may then be employed to fasten the rear surface of the mirror 12 to the package. In this manner, the mirror may be securely, but removably mounted for use. When not in use, the mirror is stored within the package. The presence of the suction cups 18 provides for additional cushioning to the package thereby further protecting the mirror 12 from breakage.

There are a wide variety of materials which may be employed for fabrication of the package 10. It is generally preferred that the case and suction cups 18 comprising the package 10 be fabricated as a unitary body, and such fabrication may be readily accomplished by well-known techniques such as injection molding and the like. Obviously, the suction cups 18 must be fabricated from a resilient material such an elastomer and in such instances where the package is a unitary item, the entire package 10 will be fabricated from the elastomeric material. There are a wide variety of such materials known and available to those of skill in the art. Some materials which may be employed with advantage are elastomeric formulations of polyvinyl chloride, natural rubber, synthetic rubber, and a wide variety of synthetic organic polymers.

While the package 10 is most expediently formed as a single unitary member, in some instances it may be advantageous to fabricate it as a composite member, that is to say as an assemblage of separately formed parts. For example, the package 10 may first be fabricated as a case not including any suction means, and one or more suction cups may subsequently be applied thereto as for example by mechanically or adhesively affixing those cups. Obviously, such fabrication methodologies are a matter of design choice and well within the skill of on knowledgeable in the art.

The package of the present invention may be fabricated in a variety of embodiments. For example, the package may include various figurations of suction means. Referring now to FIG. 2A, there is shown a package 20 structured in accord with the principles of, the present invention. The package 20 is generally similar to that of FIG. 1 except that the suction means associated with a front surface 14 thereof comprises a plurality of individual suction cups 18 arranged in a particular matrix so as to define a region 22 devoid of suction cups. This region 22 is ideally adapted to bear advertising logos, messages or other such indicia. As is well-known to those skilled in the art, such indicia may be affixed by printing, embossing or silk screening directly onto the material of the package 20 or by other techniques such as adhesively affixing or laminating a printed label, medallion or similar item onto the package 20. The inclusion of indicia makes the package of the present invention ideally suited for advertising or other such promotional purposes.

Referring now to FIG. 2B, there is shown yet another configuration of package 30 structured in accord with the principles of the present invention. The package 30 of FIG. 2B is generally similar to those previously described except that the suction means associated with the depicted front member 14 comprises a matrix of individual suction cups 18 arrayed in a circular pattern. Obviously, the rear surface which is not shown in this figure may include any of the herein depicted arrangements of suction means.

It should be apparent from the foregoing figures that there are many configurations which may be employed to provide suction means consisting of a plurality of individual suction cups. For example, the suction cups may be placed in diagonal corners leaving a diamond-shaped central region free for indicia. Similarly, a diagonal stripe of suction cup-free area may be likewise provided. In yet other embodiments, the suction cups may form a perimeter about the edge of the front 14 and/or rear members. The sole criterion in selection of the particular configuration of suction cups will be the achievement of proper adhesion of the case to a surface and the mirror to the case. Within this constraint, obviously many possible design choices of suction cup configuration will be apparent to a designer skilled in the art and all of such embodiments are within the scope of the present invention.

While the foregoing examples depict suction means configured as a large number of relatively small suction cups, such need not be the case. Referring now to FIG. 2C there is shown yet another embodiment of package 40 structured in accord with the principles of the present invention. The package 40 includes a front surface 14 having only two relatively large suction cups 42 thereupon. Such large cups are capable of affixing a mirror to the package 40 as well as affixing the package 40 to a smooth surface. It should also be appreciated from FIG. 2C that a single suction cup would also suffice in a similar manner.

The suction means employed in the practice of the present invention need not be restricted to conventional suction cup devices per se. FIG. 2D illustrates yet another embodiment of package 50 of the present invention and including a single, relatively large, rectangular suction cup 52 associated therewith.

FIG. 2D also depicts yet another feature of the present invention. As shown therein, the case 50 may include means for retaining the handle of toothbrush, razor or similar article therein. Toward that end, the case 50 includes a loop 54 formed thereupon and having an opening therein sufficient to retain such items.

Obviously other variations may be made in the design of the package of the present invention. For example, the package may be configured as a generally circular package (it being understood that the term "generally circular" includes ovals, ellipsoids and the like), a triangular package, or any other such shape. The package of the present invention need not be restricted to mirrors, but may be employed to hold and mount photographs or other pictures as well as any other planar object.

From the foregoing, it should be apparent that the present invention provides a package adapted to protect and retain a mirror therein and further adapted to removably affix that mirror to a surface such as a shower stall, wall or locker, thereby facilitating use of the mirror. The package includes suction means for accomplishing the affixation and such suction means may comprise a variety of suction devices known to those of skill in the art. Furthermore, the package may also include means for supporting a toothbrush, razor or similar item. In accord with these principles, it should be apparent to one of skill in the art that a great many variations of the present invention are possible in light of the teaching herein. Accordingly, the foregoing drawings, description and discussion are merely meant to illustrate certain embodiments of the present invention and are not meant to be limitations upon the practice thereof. It is the following claims, including all equivalents, which define the scope of the invention.

We claim:

1. A package for retaining a rigid, generally planar article therein and for removably affixing the article to a surface, said package comprising:
   a case including a generally planar front member, a generally planar back member and a side member joining the front and back members in a spaced apart, generally co-planar relationship so as to define an interior cavity therebetween adapted to receive said article, the case further having an opening therethrough communicating with the interior cavity and having a size sufficient to permit passage of the article therethrough;
   first suction means disposed upon an exterior surface of the front member and operative to removably affix the case to a smooth surface; and
   second suction means disposed upon an exterior surface of the back member and operative to removably affix the article to the case, whereby said case is adapted to receive and retain the article therein as well as to provide for the removable mounting of the article onto a smooth surface.

2. A package as in claim 1, wherein said front and back members are generally rectangular members and the side member joins three edges of the front member to three corresponding edges of the back member, the unjoined edges defining the opening.

3. A package as in claim 1, wherein said case and said first and second suction means are configured as a unitary body.

4. A package as in claim 3, wherein said unitary body is fabricated from an elastomeric material.

5. A package as in claim 4, wherein said elastomeric material is selected from the group consisting essentially of synthetic rubber, natural rubber, polyvinyl chloride, and combinations thereof.

6. A package as in claim 1, wherein at least one of said first and second suction means comprises a plurality of suction cups.

7. A package as in claim 6, wherein said plurality of suction cups are arrayed in a matrix covering substantially all of the member upon which said suction means is disposed.

8. A case as in claim 6, wherein said plurality of suction cups are disposed so as to cover only a portion of the member upon which said suction means is disposed.

9. A package as in claim 1, wherein at least one of said first and second suction means comprises a single suction cup.

10. A package as in claim 9, wherein said suction cup has a generally circular perimeter.

11. A package as in claim 9, wherein said suction cup has a generally rectangular perimeter.

12. A package as in claim 1, wherein the exterior of at least one of said front and back members includes a region adapted to have indicia displayed thereupon.

13. A package as in claim 1, further including means adapted to retain the handle of an article therein.

14. A package as in claim 13 wherein said retaining means comprises a loop.

15. A package for retaining a mirror therein and for removably affixing the mirror to a surface, the package comprising:
   a case fabricated from a resilient material and including a generally planar front member and a generally planar back member joined along a portion of their respective perimeters in a spaced apart, generally coplanar relationship by a side member so as to define an interior cavity therebetween adapted to receive the mirror, the unjoined portions of the respective perimeters providing an opening therethrough communicating with the interior cavity and being of a size sufficient to permit passage of the mirror therethrough;
   a first plurality of suction cups disposed upon an exterior surface of the front member and operative to removably affix the case to a smooth surface; and
   a second plurality of suction cups disposed upon an exterior surface of the back member and operative to removably affix the mirror to the case, whereby the package is adapted to receive and retain a mirror therein as well as to provide for the removable mounting of the mirror onto a smooth surface.

* * * * *